(12) United States Patent
Becker et al.

(10) Patent No.: US 7,971,843 B2
(45) Date of Patent: Jul. 5, 2011

(54) LONGITUDINAL GUIDE FOR MOTOR VEHICLE SEATS WHICH ARE ADJUSTABLE IN A LONGITUDINAL DIRECTION AND ALSO REMOVABLE

(75) Inventors: Burckhard Becker, Solingen (DE); Robert Houston, Leichlingen (DE); Stefan Pietas, Solingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 280 days.

(21) Appl. No.: 12/399,007

(22) Filed: Mar. 5, 2009

(65) Prior Publication Data
US 2009/0224130 A1    Sep. 10, 2009

(30) Foreign Application Priority Data

Mar. 5, 2008  (DE) .................. 10 2008 012 738

(51) Int. Cl.
*F16M 13/00* (2006.01)
(52) U.S. Cl. .................. 248/424; 248/429; 297/344.1
(58) Field of Classification Search .............. 248/419, 248/429, 424
See application file for complete search history.

(56) References Cited

U.S. PATENT DOCUMENTS

| 4,044,445 | A |   | 8/1977  | Douri |
|-----------|---|---|---------|-------|
| 4,209,159 | A |   | 6/1980  | Becker et al. |
| 4,742,983 | A | * | 5/1988  | Nihei ............................ 248/429 |
| 6,113,051 | A | * | 9/2000  | Moradell et al. ............. 248/430 |
| 6,488,249 | B1 | * | 12/2002 | Girardi et al. ................. 248/429 |
| 7,717,392 | B2 | * | 5/2010  | Sakakibara et al. .......... 248/429 |
| 2004/0217251 | A1 | * | 11/2004 | Leguede et al. ............... 248/424 |

FOREIGN PATENT DOCUMENTS

| DE | 25 51 262 | 5/1976 |
| DE | 27 15 640 | 10/1976 |
| DE | 28 20 151 | 11/1977 |
| GB | 1 573 896 | 8/1980 |

* cited by examiner

*Primary Examiner* — Amy J Sterling
(74) *Attorney, Agent, or Firm* — McCarter & English, LLP

(57) ABSTRACT

A longitudinal guide for motor vehicle seats having a bottom rail and a seat rail that are displaceable with respect to each other in one longitudinal direction. The motor vehicle seats are adjustable in a longitudinal direction and are also removable from the longitudinal guide. Detents are formed in the bottom rail. The seat rail comprises a base part and a supporting part. The base part has at least one front and at least one rear transverse bolt, which cooperate with the detents. The base part is adjustable with respect to the supporting part between a lower position, in which the transverse bolts are not engaged with the detents, and an upper position, in which the transverse bolts engage detents. Only in the lower position is the seat rail displaceable with respect to the bottom rail.

15 Claims, 6 Drawing Sheets

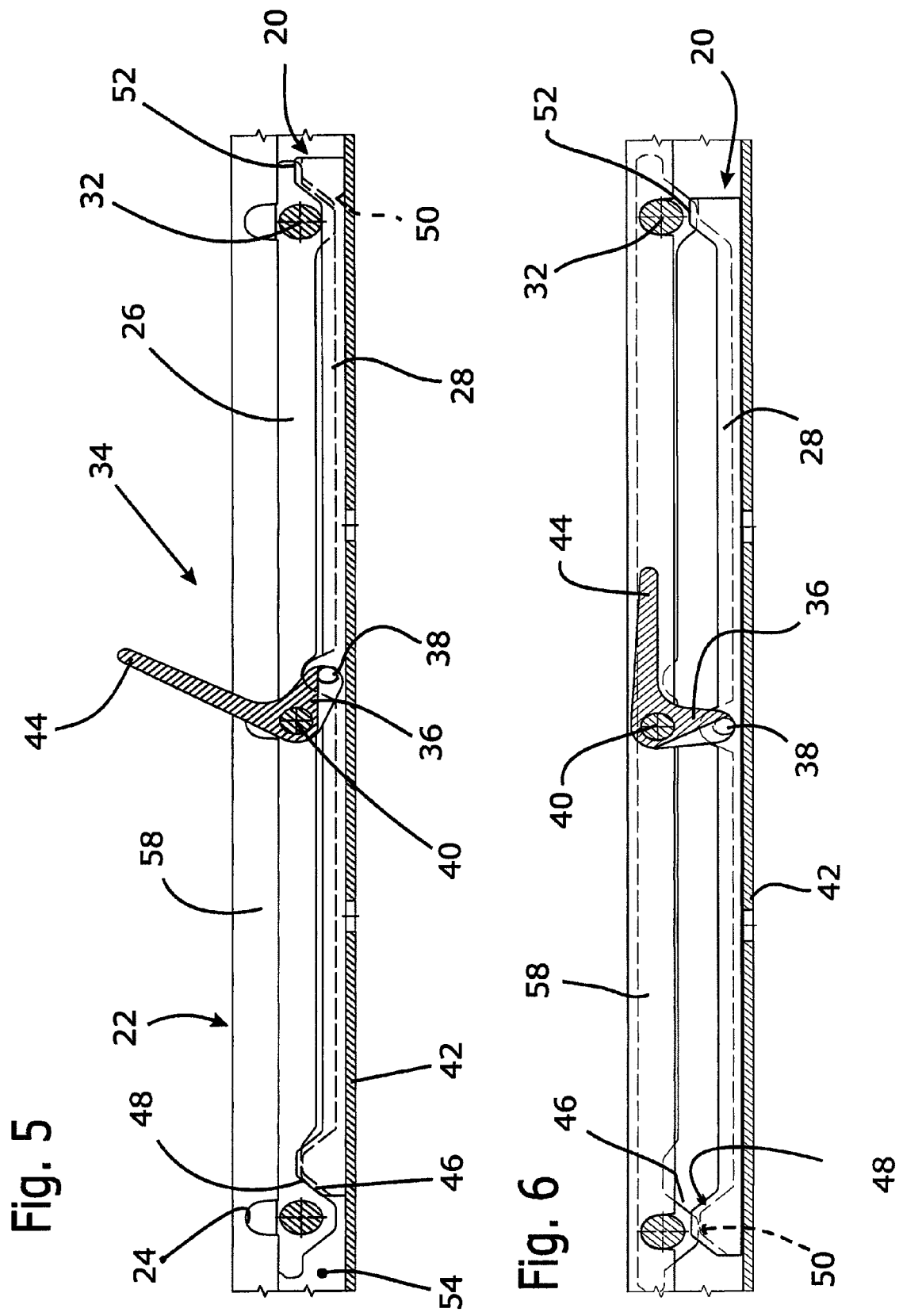

LONGITUDINAL GUIDE FOR MOTOR VEHICLE SEATS WHICH ARE ADJUSTABLE IN A LONGITUDINAL DIRECTION AND ALSO REMOVABLE

CROSS-REFERENCE TO RELATED APPLICATIONS

This patent application claims priority to co-pending German Patent Application No. DE 10 2008 012 738.8, filed Mar. 5, 2008, which is hereby expressly incorporated by reference in its entirety as part of the present disclosure.

BACKGROUND OF THE INVENTION

The invention relates to a longitudinal guide for motor vehicle seats that are adjustable in a longitudinal direction and may also be removed from the longitudinal guide, said longitudinal guide comprising a bottom rail and a seat rail, which are displaceable with respect to each other in a longitudinal direction, and detents being formed in the bottom rail.

Longitudinal guides of this type are generally known; the reader is referred to the documents DE 28 20 151 A1, DE 25 51 262 B2 or DE 27 15 640 A1 by way of example only.

In particular on multi-purpose vehicles, longitudinal guides or rail guides are desired in which the vehicle seats are adjustable in the longitudinal direction as this is possible with the help of the above mentioned prior art longitudinal guides, said guides however also allowing to additionally remove the vehicle seats. According to prior art, with the previously known longitudinal guides, motor vehicle seats are solidly connected to the seat rail. Removability however requires a releasable connection.

SUMMARY OF THE INVENTION

This is where the invention comes in. It is its object to indicate a longitudinal guide that allows for longitudinal adjustment in one longitudinal direction in a known way but that is concurrently suited for removable vehicle seats. The longitudinal guide should be of a simple construction, as far as practicable of a weight-saving configuration and offer high security.

In view of the longitudinal guide of the type mentioned herein above, this object is achieved in that the seat rail comprises a base part and a supporting part, that said base part comprises at least one front and at least one rear transverse bolt, each cooperating with the detents, and that said base part is adjustable with respect to the supporting part between a lower position in which the transverse bolts are not engaged with the detents and the seat rail is displaceable with respect to the bottom rail, and an upper position in which the transverse bolts engage detents.

With this longitudinal guide, the bottom rail is substantially formed as it may be found in prior art as well. What is changed is the seat rail though. It is no longer made from one piece like in prior art but comprises instead a base part and a supporting part. The base part has at least one transverse bolt, one transverse bolt being preferably located at the rear and one transverse bolt at the front. Each transverse bolt cooperates with one of the detents that are formed on the bottom rail. If for each transverse bolt there is only provided one detent, a longitudinal adjustment is possible but there is only one stopped position within the longitudinal adjustment. Therefore, it is preferred to provide several detents.

The thus configured seat rail is appropriately releasably connected to a motor vehicle seat. For this connection, prior art devices can be utilized.

Base part and supporting part can be moved with respect to each other substantially in the z direction. The base part is thereby caused to move with respect to the supporting part, the supporting part remains preferably in contact with the bottom rail, in particular with its base flange. If the base part is in the lower position, the transverse bolts are not engaged with the detents and longitudinal adjustment is possible. If the base part is in the upper position, the transverse bolts engage a detent and longitudinal adjustment is not possible. The longitudinal guide is stopped.

Advantageously, the longitudinal guide makes use of the high capacity of a bottom rail to withstand snapping out and of its rigidity if said bottom rail is configured accordingly. Base part and supporting part form together a kind of carriage. In a preferred embodiment, at least one of the two parts, meaning base part or supporting part, are formed from two parallel elongate sheet steel strips. The sheet steel strips of the supporting part form a kind of skid of a carriage. They rest on a base flange of the bottom rail.

In an advantageous developed implementation, a lever arrangement is provided between the supporting part and the base part. It comprises a clamping arm. The clamping arm is articulated with the base part and the supporting part. Preferably, there is provided a hand lever by means of which the clamping arm can be actuated. Depending on the position of the clamping arm, the base part is located in the upper or in the lower position. Both positions are stable, there are provided appropriate provisions for the lever arrangement not to change by itself, in particular for it not to disengage itself.

The movement of the base part between the upper position and the lower position, which occurs substantially in the z direction, occurs on a path which causes the transverse bolt to move between engagement and release. If the base part is in its lower position and if there is no detent above a transverse bolt, the base part might be possibly caused to raise slightly; by no means however will a stable position be reached, the hand lever remaining instead in a position corresponding to a release. Preferably, it can be clearly seen from the position of the hand lever whether the longitudinal guide is snapped in or not. During movement of the base part, the supporting part remains stationary with respect to the bottom rail.

In a preferred developed implementation, the profile of the bottom rail has a base flange from which a side flange projects in the same direction on the left and on the right side thereof. Each side flange is adjoined with a U region, said U region being adjoined so that a connected flange of the U region extends as a continuation of the neighboring side flange and that the free flange of the U region is located between the connected flanges. A high capacity of withstanding snapping out will be achieved in particular if the base part is capable of engaging the U regions from inside. Such an engagement is possible for example if the base part is made from two longitudinal sheet steel strips.

Other features and advantages will become more apparent upon reviewing the appended claims and the following non restrictive description of an embodiment of the invention, given by way of example only with reference to the drawings.

BRIEF DESCRIPTION OF THE DRAWINGS

FIG. 5 shows a sectional view in the x-z plane through the length-wise centerline of a portion of a longitudinal guide behind a longitudinal guide, the base part is in a lower position.

FIG. 6 shows a longitudinal section as shown in FIG. 5, but the base part is now in an upper position.

DETAILED DESCRIPTION OF THE INVENTION

Figure 1:
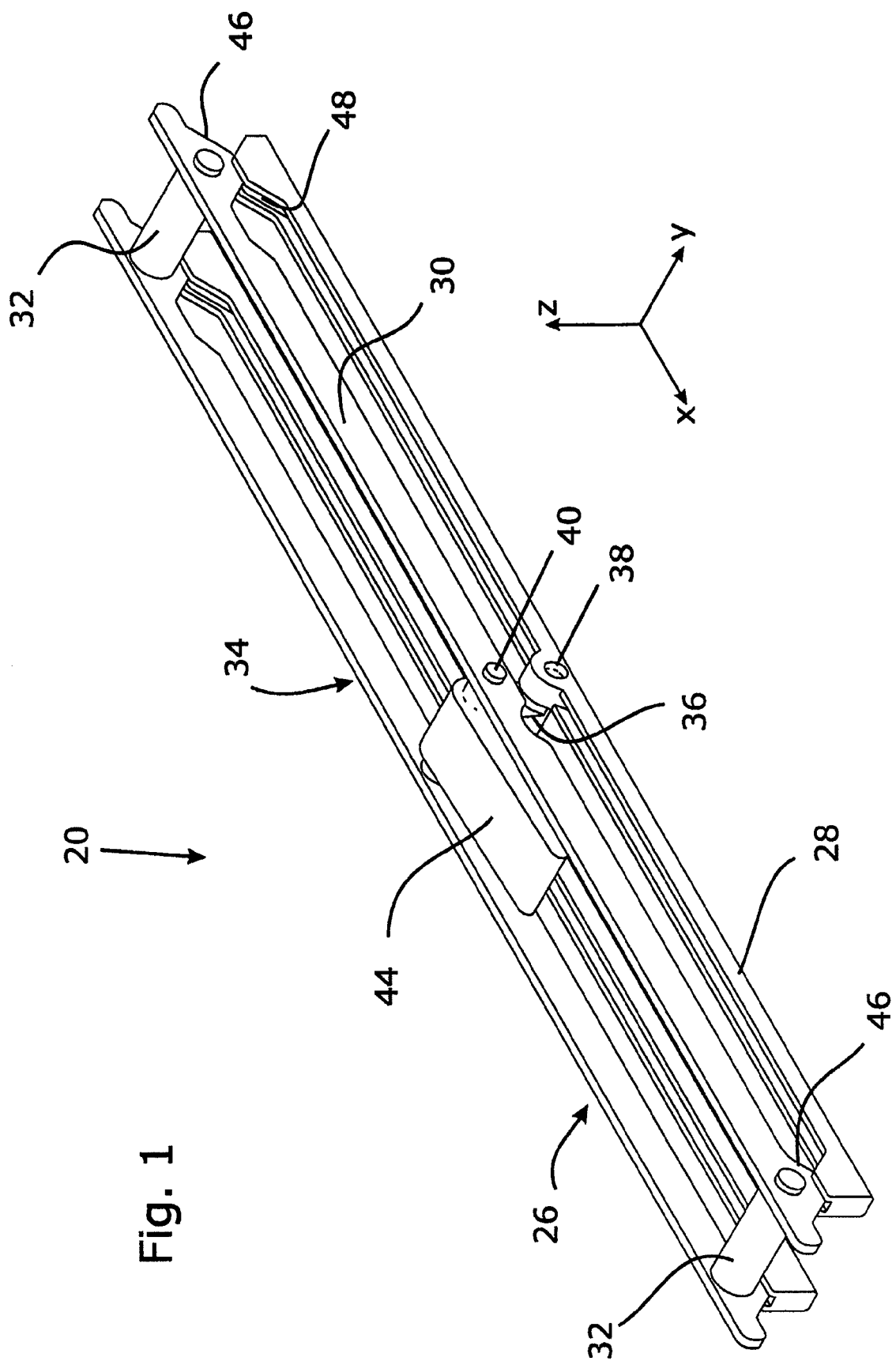
FIG. 1 shows a perspective illustration of a seat rail of the longitudinal guide, the upper position of the base part being shown with respect to the supporting part.
Figure 2:
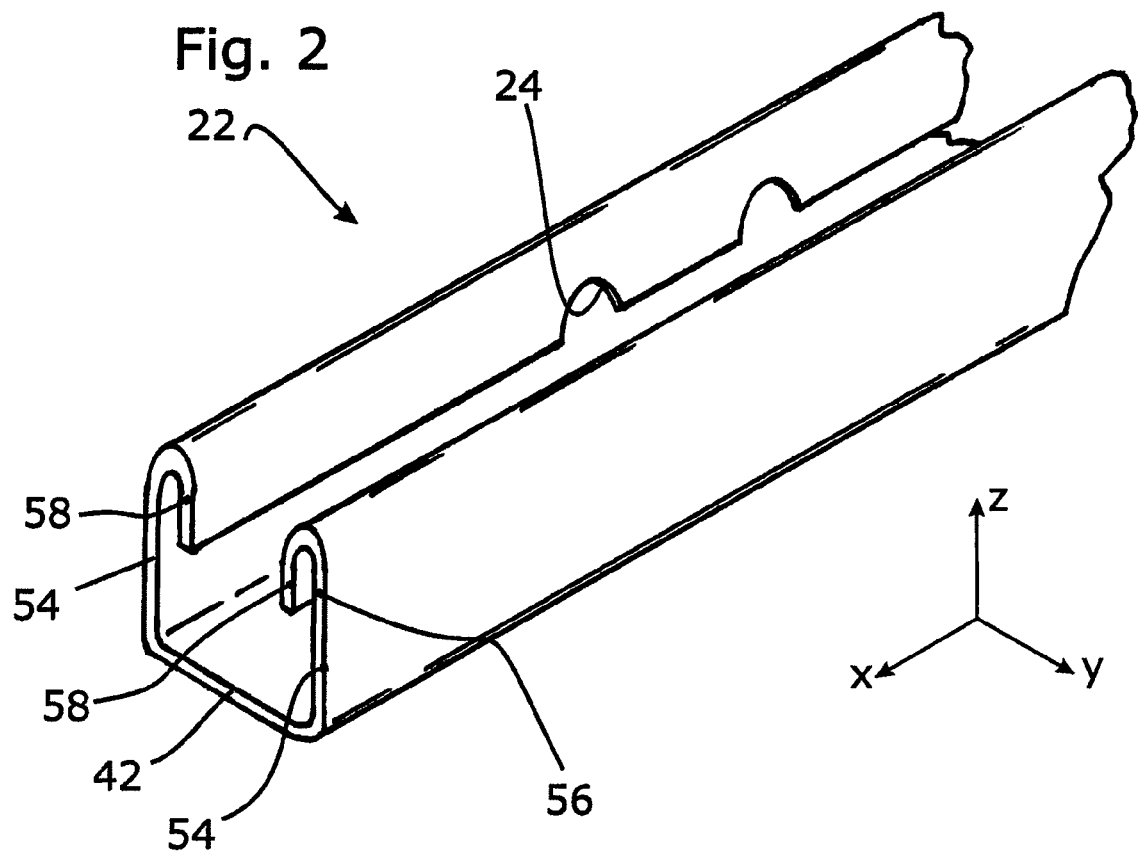
FIG. 2 shows a perspective illustration of a portion of a bottom rail that is devised for the seat rail shown in FIG. 1.

The longitudinal guide is composed of a seat rail 20 as shown in FIG. 1 and of a bottom rail 22 as shown in FIG. 2. In the sectional view shown in FIG. 3, both rails 20, 22 can be seen in the assembled condition. They are displaceable with respect to each other in the longitudinal direction of the rail, which coincides substantially with the x direction, as this is also prior art. In the bottom rail 22, detents 24 are formed; they face each other by pairs in the x-z plane. In FIG. 2 there are shown two such pairs of detents 24 placed behind each other; there may also be provided more pairs of detents. The seat rail 20 is typically about 35 cm long, the length ranges between 20 and 50 cm. The bottom rail 22 is approximately double this length and ranges about 1.5 times to 2.5 times the length of the seat rail 20. The detents 24 are recesses or bights that are open toward the bottom; they are for example semicircular or half long holes, meaning a semi-circle with adjoined, rectilinear, parallel flanks.

Figure 4:
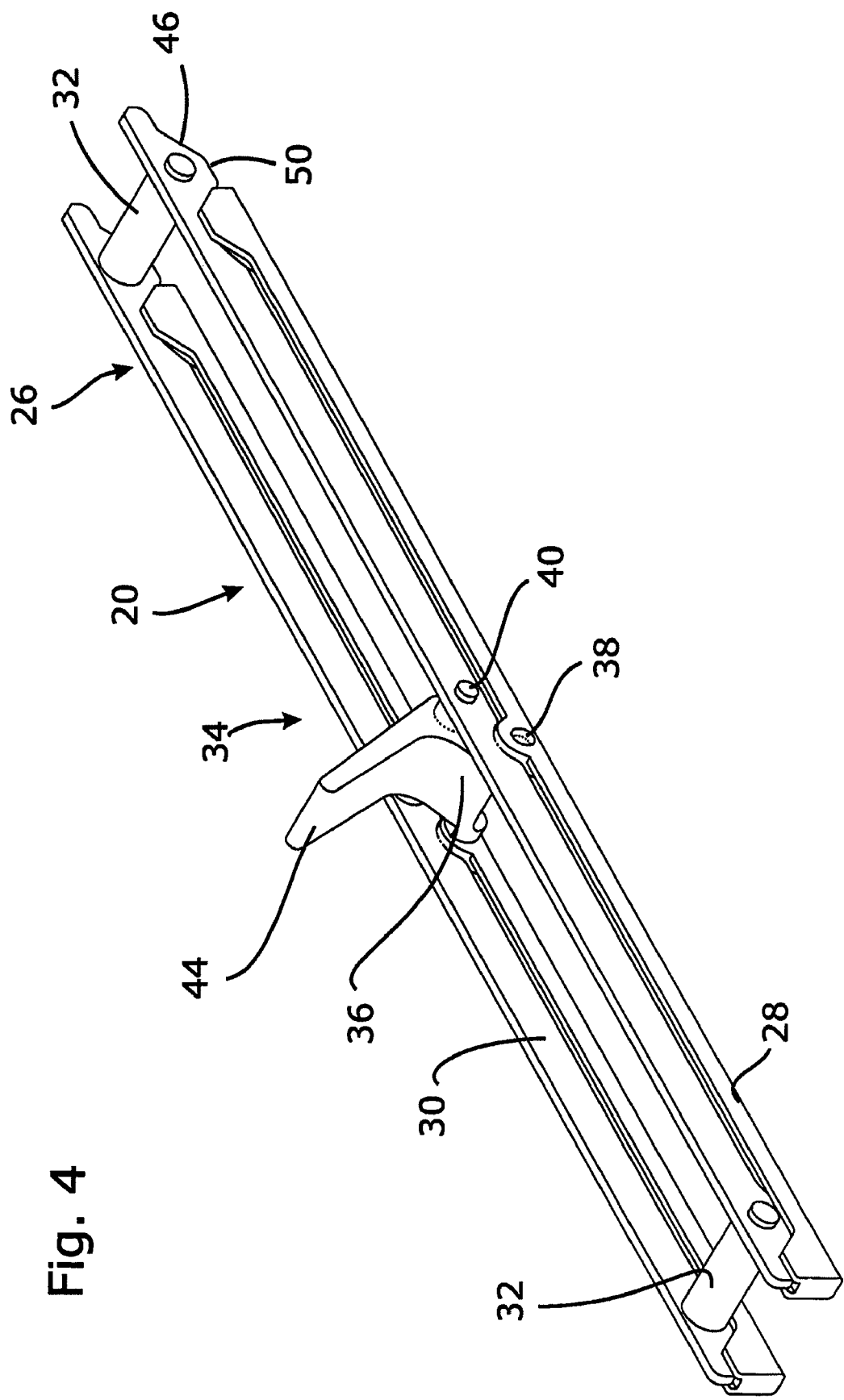
FIG. 4 shows the seat rail as shown in FIG. 1, but now in the lower position.

The seat rail 20 comprises a base part 26 shown in the top portion of the drawing and a supporting part 28 located underneath. The base part 26 comprises two elongate sheet steel strips 30 that extend in the x-z plane and are built identically. It additionally has a front and a rear transverse bolt 32 that joins the respective sheet steel strips 30 together and holds them together at a distance from each other. The supporting part 28 consists of two identically built, elongate sheet steel parts that form a longitudinal groove that is open toward the top at least in the front and in the rear region, a respective one of the sheet steel strips 30 engaging said groove from the top. A lateral association between base part 26 and supporting part 28 (in the y direction) is achieved as a result thereof and the possible movements are substantially limited to movements within the x-z plane. In the first instance, this limitation is achieved through a lever arrangement 34. There is provided a clamping arm 36 that is articulated in its lower end region to the two side parts of the supporting part 28 through a lower axis 38 and to the two sheet steel strips 30 through an upper axis 40 at its upper end. In the position shown in FIG. 1, this clamping arm 36 is almost in the y-z plane. It is also preferably in the range of self-locking, see FIG. 6 in this context. By contrast, the clamping arm 36, in the lower position of the base part 26, see for example the FIGS. 4 and 5, is pivoted with respect thereto an angle of about 60°, forming with a base flange 42 of the bottom rail 22 an angle of about 30°.

Further, the lever arrangement 34 has a hand lever 44 which, in the exemplary embodiment shown, is integral with the clamping arm 36 and projects therefrom at right angles. In the upper position of the base part 26, it extends parallel to the longitudinal direction of the rail and is located within the scope of the rails. In the lower position of the base part 26, it projects obliquely upward and protrudes from the actual scope of the rails.

In an alternative that has not been shown herein, the clamping arm 36 is only articulated to the two sheet steel strips 30 of the base part 26 through the upper axis 40. It has a free end that can abut the base flange 42 of the bottom rail 22 or alternatively the supporting part 28 and get clammed together therewith.

In proximity to the transverse bolts 32, each supporting part 28 comprises an inclined surface 46 that is inclined approximately at an angle of 45° with respect to the base flange 42. It cooperates with a mating inclined surface 48 that is configured to be a slot and is provided in the supporting part 28. Upon movement of the base part 26 with respect to the supporting part 28 from the lower position, see for example FIG. 5, to the upper position, see for example FIG. 6, these inclined surfaces 46, 48 glide on each other. As a result and through the lever action of the clamping arm 36, the base part 26 is caused to move toward the top, away from the supporting part 28. If in the course of this movement the clamping arm 36 increasingly achieves its right-angled position with respect to the base flange 42, the two parts 26, 28 substantially only perform a pushing movement, substantially in the x direction with respect to each other, but no raising movement. This pushing movement is made use of to push a plateau 50 of the base part 26 onto a mating plateau of the supporting part 28; in the condition shown in FIG. 6, these plateaus 50, 52 are contacting each other. The course of the inclined surfaces 46, 48 and of the plateaus 50, 52, is adapted to the sequence of movements achieved by the clamping arm 36. In the lower position of the base part 26, as shown in FIG. 5, a projection, which is limited toward the top by the mating plateau 52, engages a corresponding recess of the base part 26; this recess is located on the side of the inclined surface 46 that lies opposite the plateau 50.

When viewed in profile, the bottom rail 22 has the base flange 42, from which a left and a right side flange 54 projects parallelly upward on either end side 54. The side flanges 54 merge into a connected flange 56 that belongs to a U region, said U region additionally has a free flange 58. The free flange 58 is located on the inner side of a respective one of the two connected flanges 56. It has a free end that is pointed toward the base flange 42. In this free flange 58 there are formed the detents 24. The profile of the bottom rail 22 is mirror-symmetrical with respect to an x-z plane that extends through the center of the profile. It is advantageous if the free flanges 58 are of a length and if their spacing is chosen so as not to hinder each other when bending upward.

The bottom rail 22 has an elongate upper longitudinal opening 60 that is defined by the free flanges 58. In the y direction, the seat rail 20 is wider than this longitudinal opening 60. Put another way, in the y direction the seat rail 20 is wider than the clear distance between the free flanges 58. More particularly, the transverse bolts 32 are longer than the outer spacing between the free flanges 58.

It is possible but has not been shown herein that the seat rail 20 is elastically biased in the positive z direction by an appropriate spring, in particular that the base part 26 is slightly elastically biased with respect to the supporting part 28 in this direction. This should be the case when the base part 26 is in its lower position. As a result, the transverse bolts 32 are dragged along the free ends of the free flanges 58 during longitudinal adjustment and enter partially, to a certain or small extent by themselves, into the detents 24. Accordingly, they show a user that he has reached a detent 24. They however hinder the longitudinal displacement but little so that it remains possible for the longitudinal displacement to continue beyond the detent so that other detents 24 can be reached that make themselves also noticeable to the user.

The lever arrangement 34 can be positioned almost anywhere. In the embodiment shown, it is approximately in the center. But it may also be positioned somewhere else and also depending on the requirements of the manufacturer.

Figure 7:
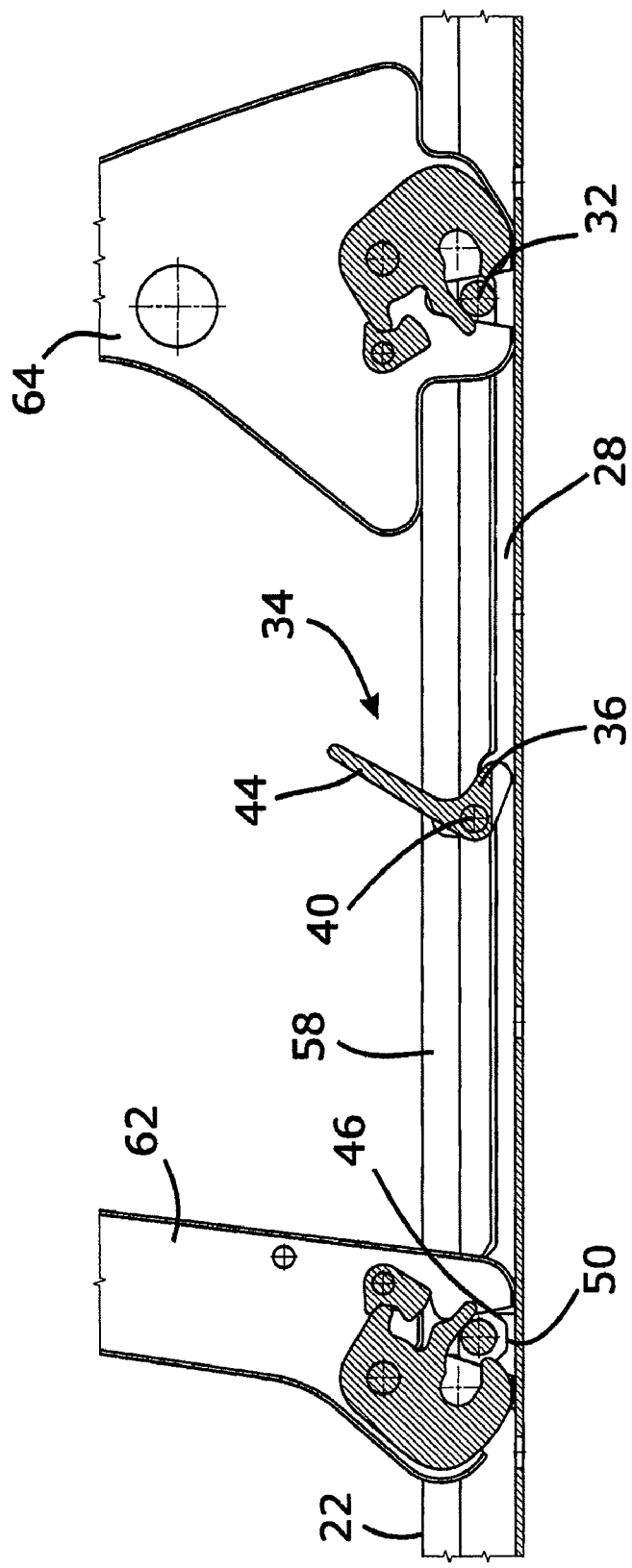
FIG. 7 shows a longitudinal section as shown in FIG. 5, but now with an additionally drawn front and rear support of a motor vehicle seat, which are both not stopped.
Figure 8:
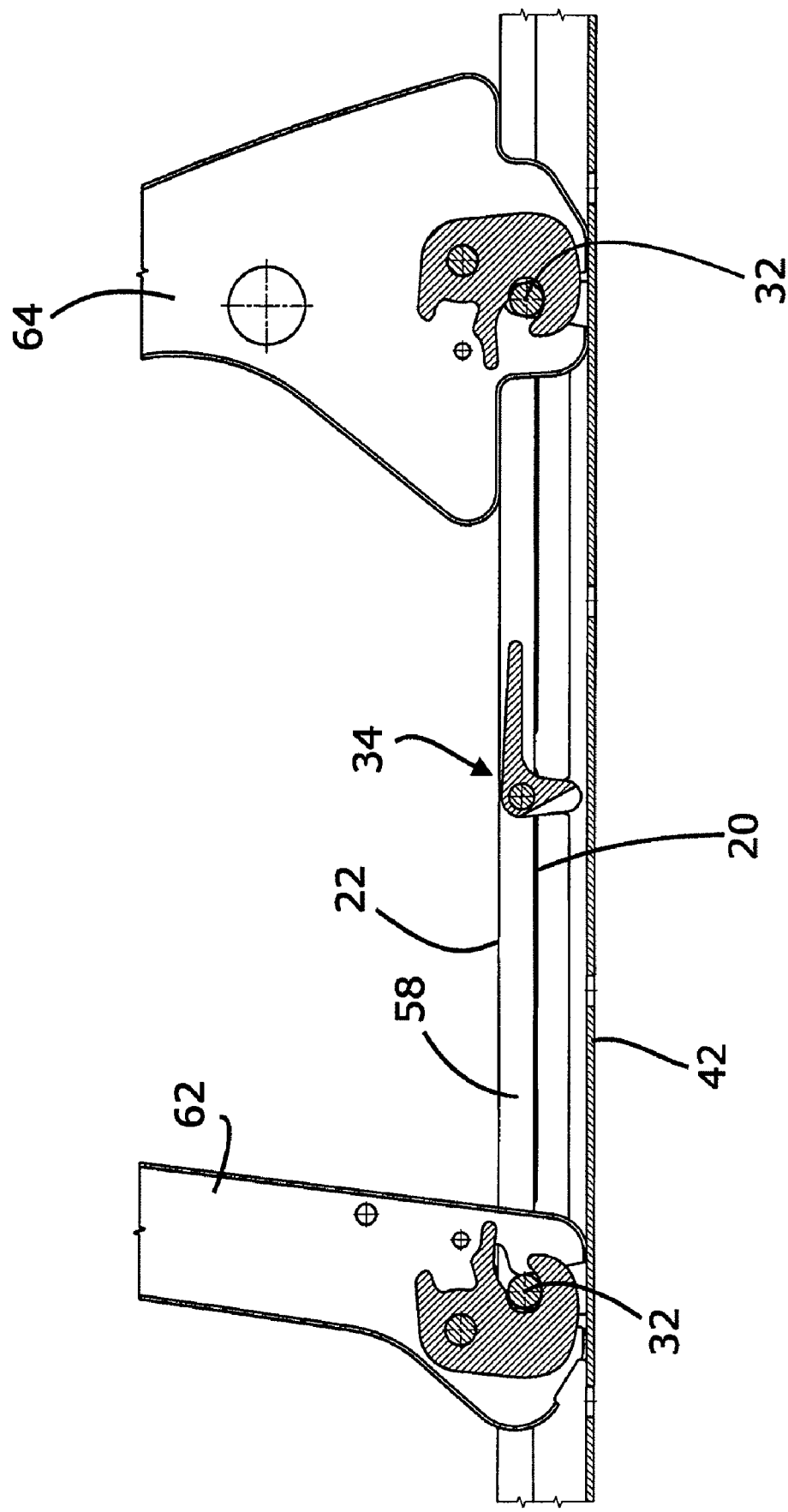
FIG. 8 shows the illustration of FIG. 7, with the longitudinal guide being in the condition shown in FIG. 6 and now with locked supports of the motor vehicle seat.

The FIGS. 7 and 8 show a prior art plug-type or a quick-release closure on lower end regions of supports 62, 64 of a prior art vehicle seat that has not been illustrated in closer detail herein. When, starting from the locked position as shown in FIG. 8, the vehicle seat is to be adjusted, the lever arrangement 34 is at first opened and then the plug fastening of the seat is released. The bolts 32 can now plunge underneath the detents 24 of the rail and the vehicle seat is slidable lengthwise. On the next detent 24, the complete system may then be locked by means of the mere lever arrangement 34. The rotary catches on the supports 62, 64 are automatically rotated when the bolts are being pushed upward into the detent position. Then, they reach again the position shown in FIG. 8.

Figure 3:
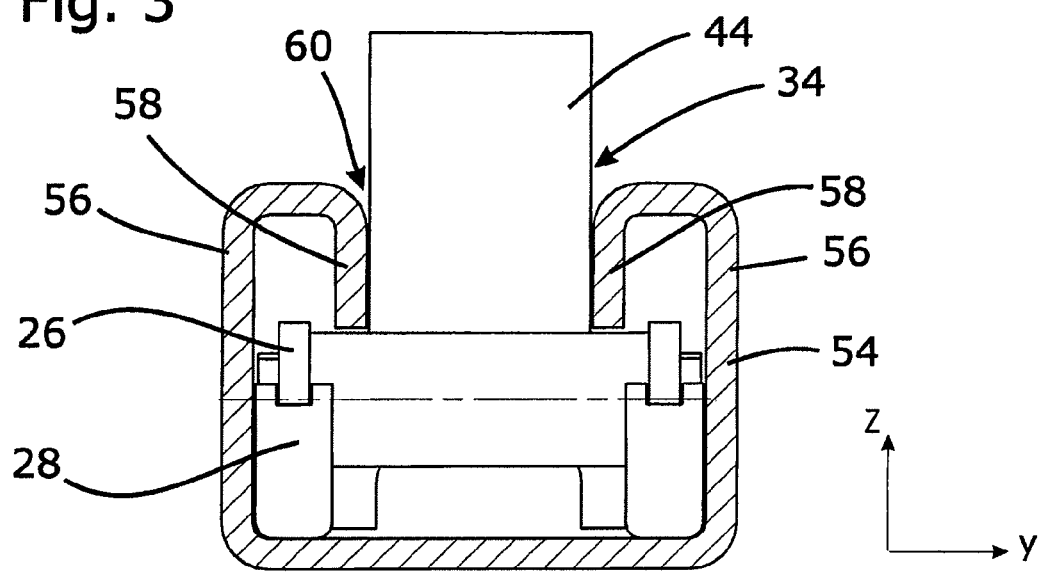
FIG. 3 shows a perspective illustration of a portion of a bottom rail that is devised for the seat rail shown in FIG. 1.

As shown in FIG. 3, the outer dimensions in the y direction of the seat rail 20 correspond approximately, with a slight minus allowance of 0.1 to 5%, to the clear inner spacing of the two side flanges 54. The supporting part 28 is in constant contact with the bottom flange 42. The width in the y direction of the longitudinal opening 60 is adapted to the width of the supports 62, 64 in the same direction.

What is claimed is:

1. A longitudinal guide for motor vehicle seats adjustable in a longitudinal direction and removable out of the longitudinal guide, comprising:
   a bottom rail and a seat rail, the bottom rail comprising a bottom flange, the seat rail being displaceable with respect to the bottom rail in the longitudinal direction; and
   detents formed in the bottom rail;
   wherein the seat rail comprises a base part and a supporting part, the base part comprises at least one front transverse bolt and at least one rear transverse bolt, the front transverse bolt and the rear transverse bolt cooperating with the detents, and the base part is adjustably arranged with respect to the supporting part between a lower position in which the transverse bolts are not engaged with the detents and the seat rail is displaceable with respect to the bottom rail, and an upper position in which the transverse bolts are in engagement with detents, and wherein the supporting part is in constant contact with the bottom flange.

2. A longitudinal guide for motor vehicle seats adjustable in a longitudinal direction and removable out of the longitudinal guide, comprising:
   a bottom rail and a seat rail, the seat rail being displaceable with respect to the bottom rail in the longitudinal direction; and
   detents formed in the bottom rail;
   wherein the seat rail comprises a base part and a supporting part, the base part comprises at least one front transverse bolt and at least one rear transverse bolt, the front transverse bolt and the rear transverse bolt cooperating with the detents, and the base part is adjustably arranged with respect to the supporting part between a lower position in which the transverse bolts are not engaged with the detents and the seat rail is displaceable with respect to the bottom rail, and an upper position in which the transverse bolts are in engagement with detents, and wherein the supporting part fits against a base flange of the bottom rail.

3. The longitudinal guide as set forth in claim 1, wherein a lever arrangement is provided and connects the supporting part to the base part, the lever arrangement comprises a hand lever and a clamping arm, and the clamping arm is connected both to the supporting part and to the base part through an articulated axis in each case.

4. The longitudinal guide as set forth in claim 1, wherein at least one of (i) the supporting part comprises an inclined surface and (ii) the base part comprises a mating inclined surface.

5. The longitudinal guide as set forth in claim 4, wherein at least one of the inclined portion and the mating inclined portion are adapted to the length of the clamping arm.

6. The longitudinal guide as set forth in claim 1, wherein the bottom rail has at least one free flange in the y-z plane comprising a free end, the free end points in the negative z direction and the detents are formed in the flange and are open in the negative z direction.

7. The longitudinal guide as set forth in claim 1, wherein at least one of the base part and the supporting part substantially consists of two elongate sheet steel strips.

8. The longitudinal guide as set forth in claim 7, wherein the two elongate sheet steel strips are oriented parallel to each other.

9. The longitudinal guide as set forth in claim 1, wherein at least one of the bottom rail and the seat rail are minor-symmetrical with respect to a mirror plane extending parallel to the x-z plane.

10. The longitudinal guide as set forth in claim 1, wherein the bottom rail has a profile comprising a base flange, a left and a right side flange and a left and a right U region each, the U region has a connected flange and a free flange, the connected flange extending as a continuation of a neighboring side flange and the free flange being located on an inner side of the connected flange and pointing toward the base flange.

11. The longitudinal guide as set forth in claim 1, wherein the bottom rail comprises an upper elongate opening located in the x-z plane and having a width, the seat rail is wider in the y direction than the width of the longitudinal opening.

12. The longitudinal guide as set forth in claim 1, wherein the bottom rail is longer than the seat rail.

13. The longitudinal guide as set forth in claim 1, wherein a portion of the base part is interposed between two lateral lobes of the supporting part or, in reverse, a portion of the supporting part is located between two lateral lobes of the base part.

14. The longitudinal guide as set forth in claim 1, wherein the bottom rail comprises an upper elongate opening located in the x-z plane and having a width, the seat rail is at least 20% wider in the y direction than the width of the longitudinal opening.

15. The longitudinal guide as set forth in claim 1, wherein the bottom rail is at least 20% longer than the seat rail.

* * * * *